United States Patent [19]

Jenison et al.

[11] 4,360,065

[45] Nov. 23, 1982

[54] CULTIVATOR FOR HIGH EFFICIENCY WINDROW DISINTEGRATION AND AERATION, ROW FORMING, AND THE LIKE

[76] Inventors: Eugene Jenison; Andrew Jenison, both of Rte. 3, Box 91D, Siloam Springs, Ark. 72761

[21] Appl. No.: 150,566

[22] Filed: May 16, 1980

[51] Int. Cl.³ .......................... A01B 9/00; B01F 7/04; B02C 21/02

[52] U.S. Cl. .................................. 172/119; 172/122; 241/101.7; 241/191; 241/282.2

[58] Field of Search ................... 172/119, 123, 28, 30, 172/45, 66, 122, 123, 540, 550, 554; 56/192, 372, 345, DIG. 21; 366/345, 346; 241/101.7, 282.2, 191, 282.1; 37/81

[56] References Cited

U.S. PATENT DOCUMENTS

| | | | |
|---|---|---|---|
| 179,320 | 6/1876 | Kershner | 172/554 |
| 2,841,946 | 7/1958 | Skromme et al. | 241/101.7 X |
| 3,369,797 | 2/1968 | Cobey | 56/372 X |
| 3,483,929 | 12/1969 | MacIntyre et al. | 37/81 X |
| 3,658,135 | 4/1972 | Thompson | 172/119 X |
| 4,019,723 | 4/1977 | Urbanczyk | 241/101.7 |
| 4,199,030 | 4/1980 | Chance | 172/119 X |

FOREIGN PATENT DOCUMENTS

| | | | |
|---|---|---|---|
| 275950 | 7/1930 | Italy | 172/550 |
| 994906 | 6/1965 | United Kingdom | 172/122 |
| 132881 | 12/1960 | U.S.S.R. | 172/550 |

Primary Examiner—Paul E. Shapiro
Attorney, Agent, or Firm—McCaleb, Lucas & Brugman

[57] ABSTRACT

A cultivator adapted to straddle a windrow of material such as compost. A frame has an improved disintegrator and aerator comprising a horizontal drum crosswise of the windrow with a plurality of cultivator blades disposed in two helical arrays between opposite ends of the drum, the arrays being circumferentially spaced 180° apart about the drum and extending equal distances on opposite sides of a central, longitudinal, vertical plane along the center of the frame. The blades on the right and left sides of the drum have paddle portions at their ends transversely offset toward the central vertical plane and contoured to move material sidewise and heap it up into a peak along the center of the windrow. The helical arrays of blades are identical and symmetrical on opposite sides of the windrow center, enabling repeated passes of the cultivator to circulate material between the inside and the outside of the windrow while maintaining it with a triangular cross-section of ever-increasing height and ever-diminishing base width for improved chimney effect and aerobic heat utilization within the windrow. Two specific blade shapes are shown, one primarily for windrow cultivation and aeration, and another for shredding paper, cardboard, magazines, and the like prior to composting. A modified form of rotor is disclosed, for agricultural use, to form parallel ridges and furrows in a ground surface to prepare it for planting and subsequent irrigation.

13 Claims, 14 Drawing Figures

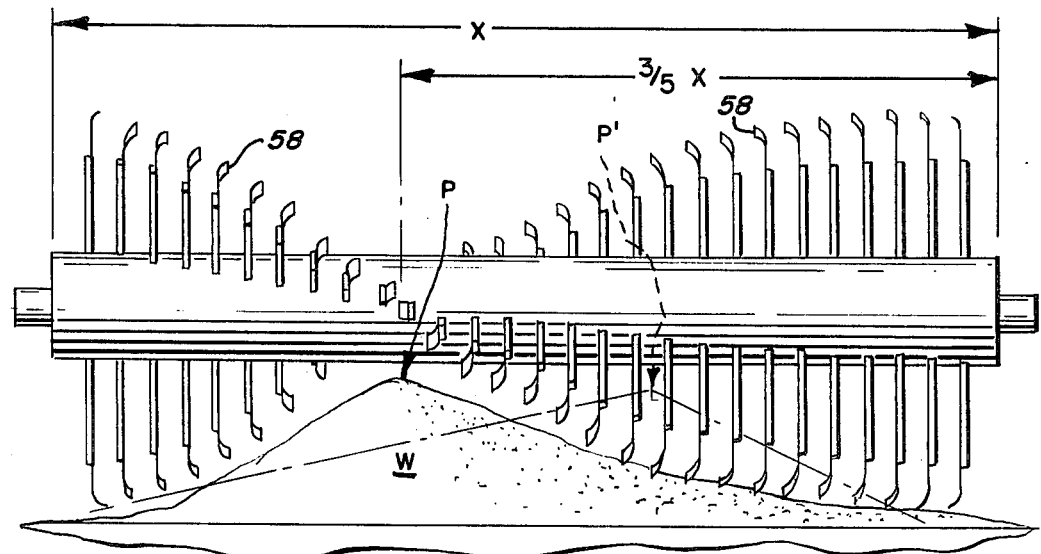
FIG. 4 (EARLY PROTOTYPE)
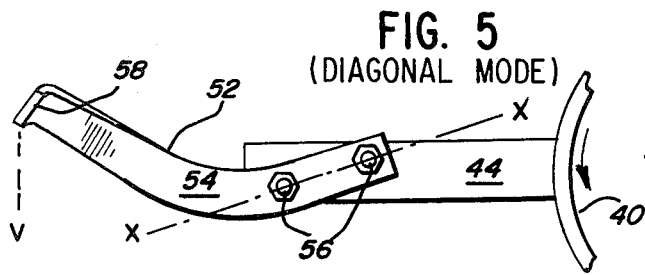
FIG. 5 (DIAGONAL MODE)
FIG. 5A (RADIAL MODE)
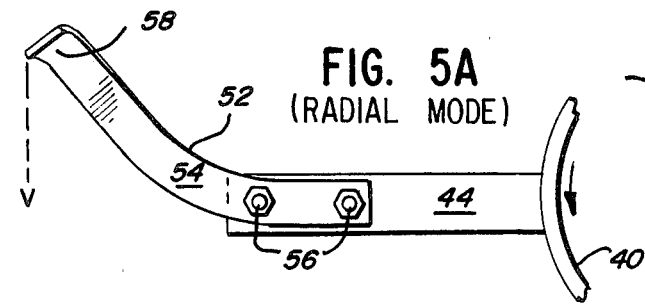
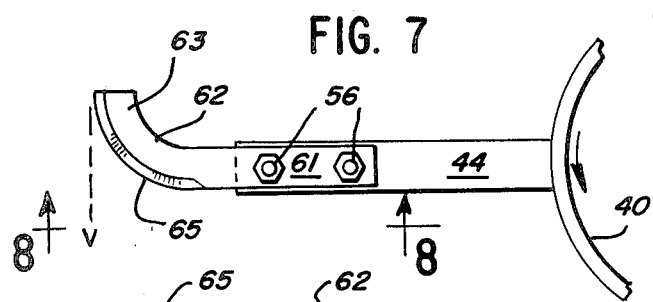
FIG. 7
FIG. 8
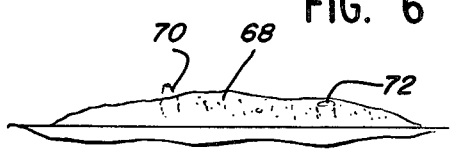
FIG. 6
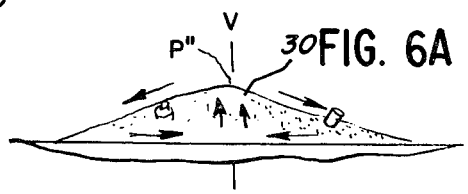
FIG. 6A
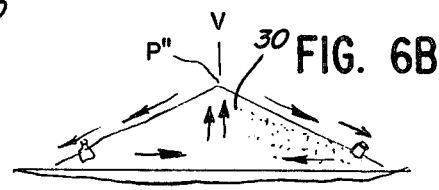
FIG. 6B
FIG. 6C

4,360,065

CULTIVATOR FOR HIGH EFFICIENCY WINDROW DISINTEGRATION AND AERATION, ROW FORMING, AND THE LIKE

BACKGROUND OF THE INVENTION

This invention relates generally to windrow cultivators, and particularly to a cultivator adapted to move along a windrow of material such as compost for circulating material between the inside and outside of the windrow to keep the material uniformly exposed to air for rapid humus-producing, aerobic action.

A prior art machine called the "Cobey Composter" manufactured by a company of that name in Galvin, Ohio has a drum with short, hardened teeth described in the company's advertising as "turning at tremendous speeds, picks up the wastes on its hardened teeth and casts the material back of the machine as the Composter travels one length of the windrow. Also, those fast-moving hardened teeth tend to shed and break up the material."

Another machine called the "SCARAB", sold by Scarab Manufacturing and Leasing Incorporated, White Deer, Tex., uses some of the principles of a hammer mill. The company's advertising states it "flails, aerates, and fluffs the waste, throwing it into pressure free windrows of proper height to avoid anerobic cores."

Another machine, called the "BROWN BEAR", made by Roscoe Brown Corporation, Lenox, Iowa, is basically just a massive auger rotating up to 180 RPM which shifts a compost pile sidewise. The company's advertising states "its reverse rotation works the windrow from the bottom up and to the side. The material doesn't pass under the machine."

Another machine, called the "Model 74-51 Composter" is made by TEREX division of General Motors, Hudson, Ohio. It has an array of seventeen huge paddles, each ten feet long and eight inches wide which are mounted on an endless chain and move upward in a continuous manner as the machine moves into the waste pile. The company's advertising states "The paddle action lifts the material and casts it in windrows to the right." It is a massive machine, weighing 53,000 pounds.

The above-described prior art machines require heavy, powerful engines. Further, the high speed fluffing and milling and shredding actions employed in them are inefficient users of energy. Applicant has developed and manufactured a compost cultivator with a drum having a helical array of cutter blades which gently but effectively comminute and circulate compostable material from the inside to the outside of a windrow with relatively small power requirements as contrasted with the prior art machines described. The disintegrator and aerator used in a prior, less efficient machine made by applicant is shown in FIG. 4.

A search of the prior art uncovered the following U.S. patents: Nos. 3,362,092; 3,369,797; 3,606,265; 3,664,645; 3,733,033; and 4,019,723.

SUMMARY OF THE INVENTION

The principal object of the present invention is to improve the blade arrangement of the windrow disintegrator and aerator in applicant's prior machine, shown in FIG. 4, reducing the power requirements even further, and enabling it to produce a triangular windrow cross-section which increases in height and decreases in base width with successive passes of the machine to give a constantly improving "chimney effect" within the windrow to better utilize the heat (up to 150° F.) generated within the windrow and hasten the conversion to humus.

Another object is to provide such a machine with an improved drum-type windrow disintegrator and aerator with an adjustable blade arrangement to adapt the machine to comminuting, mixing and other special purposes.

Another object is to provide a row forming rotor for agricultural purposes, to form in a ground surface parallel, elevated ridges and depressed furrows which can be used, for example, to plant cotton or other crops in the ridges and conduct irrigation water to the ridges through the furrows.

Other objects and advantages of the invention will be apparent from the following specification when read in connection with the accompanying drawings in which:

BRIEF DESCRIPTION OF THE DRAWINGS

FIG. 4 is a view similar to FIG. 2 showing an early prototype rotor or drum tested by applicant in developing the present invention;

FIGS. 5 and 5A illustrate different blade mountings which may be used with the present invention;

FIGS. 6, 6A, 6B and 6C are cross-sectional profiles of a compost windrow illustrating the manner in which the height of the windrow increases and the base narrows, with successive passes of the cultivator along the windrow;

FIG. 7 illustrates a special purpose blade, useful for shredding, bolted to one of the mounting posts;

FIG. 8 is a front view of the blade only showing the arcuate, leading cutting edge, as seen in the direction of arrows 8—8 in FIG. 7;

Like parts are referred to by like reference numerals throughout the drawings.

DETAILED DESCRIPTION OF THE PREFERRED EMBODIMENTS

Figure 1:
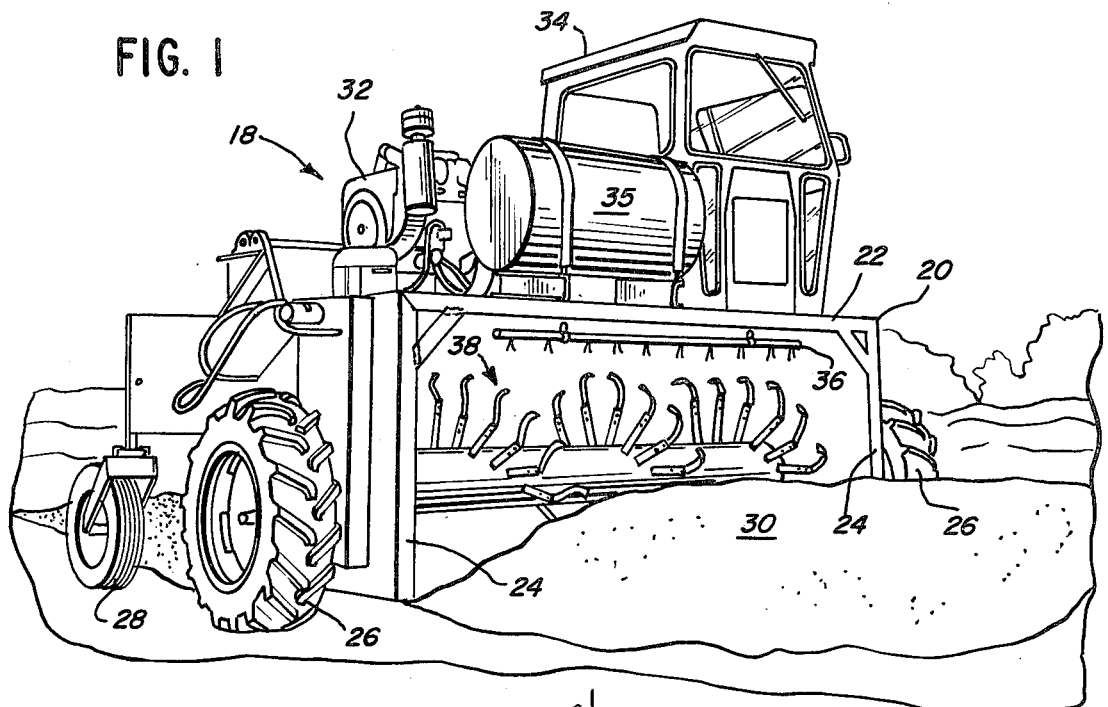
FIG. 1 is a perspective view of a preferred embodiment of the invention moving along a windrow of compost material.

Referring now more specifically to the drawings, the cultivator, generally designated 18, comprises a frame 20 having a high deck 22 supported by vertical sidewalls 24. It is ground-supported by tramming wheels 26 at the front, and caster wheels 28 at the rear. The cultivator moves along a windrow 30 of compost material by power applied to wheels 26 from engine 32 atop the deck. A weather-proof operator's cab 34 is also mounted on the deck, together with a tank 35 for various liquids, inoculums and biochemical additives which may be needed to control the composition of the end product. This will be sprayed on the windrow through a transverse spray pipe 36 by valving (not shown) controlled by an operator. The cultivator is steered by selectively powering the front wheels. Tramming and steering functions are conventional, and will not be described in detail.

A windrow disintegrator and aerator, generally designated 38, comprises a rotor or drum 40 with a pair of concentric end shafts 42 rotatably journaled in sidewalls 24. The drum is rotated in the direction of the tramming wheels, by power applied by the engine through chain 41 and sprocket 43 mounted on one end of the drum 40. A plurality of radial mounting posts 44 are fixed, as by welding, to the drum 40. These are arranged in two identical, helical arrays 44A and 44B on opposite sides of the central vertical plane of the cultivator indicated by the line V—V in FIG. 2.

The radial mounting posts 44 are arranged in diametrical pairs, preferably displaced about four inches apart along the length of the drum in a typical machine. These pairs are marked "a" through "n", in each array 44A and 44B, from the ends of the drum inwardly toward the central vertical plane V—V. Adjacent pairs are uniformly angularly offset about the drum 40, as indicated by identical angles "X" on FIG. 3. Each array 44A or 44B, in the example shown, has fourteen such diametrical pairs equally spaced and equally angularly arranged over a total of 180°, that is, one-half the circumference of the drum. Adjacent pairs n, n in the respective arrays 44A and 44B, preferably will likewise be angularly offset an angle X so there is a continuous helical progression of mounting posts 44 not only in the individual arrays 44A and 44B, but from one end of the drum to the other. Each pair of diametrically opposed posts 44 are in a common plane perpendicular to the axis of the drum. The two arrays meet at the central vertical plane V—V and comprise uninterrupted helical continuations of one another.

A cultivator blade or knife 52 is fastened to each post 44 in the helical arrangement described, thereby providing two helical arrays for the blades themselves similar to those described for the posts 44. A wide variety of blades may be used depending on the specific application. Different blades may be preferred for composting and non-composting applications; and different blades or mountings may be preferred for different materials. It will be understood that the cultivator may be used for composting a wide variety of agricultural by-products, poultry wastes, feed lot wastes, race track wastes, garbage, urban refuse and sewage sludge, just to name a few.

Figure 3:
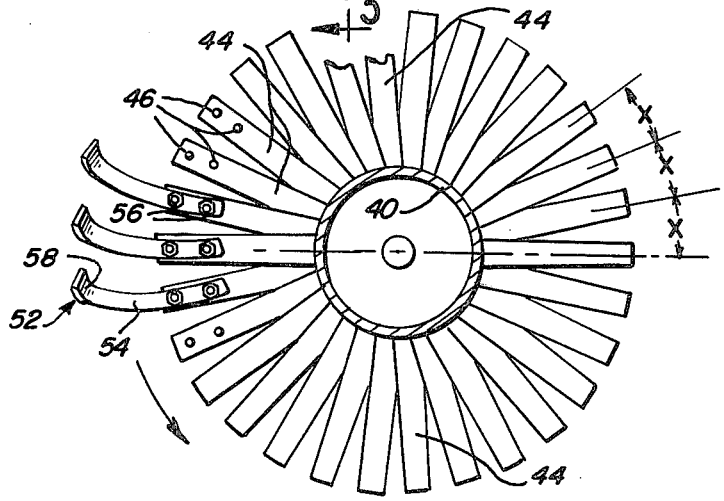
FIG. 3 is a fragmentary, vertical cross-sectional view of FIG. 2 taken along line 3—3, showing three cutter blades or knives on their respective mounting posts.

Each mounting post 44 has two bolt holes 46,46 (FIG. 3). The blades are fastened to the posts by bolts 56, 56. The bolt holes 46 may be radially aligned along their respective posts enabling the blades 52 to be fastened at substantial backwardly-canted angles as shown in FIG. 5A. Alternatively the holes and bolts may be positioned along a diagonal line X—X as shown in FIG. 5 enabling the blades to be fastened at somewhat lesser canted angles.

Figure 2:
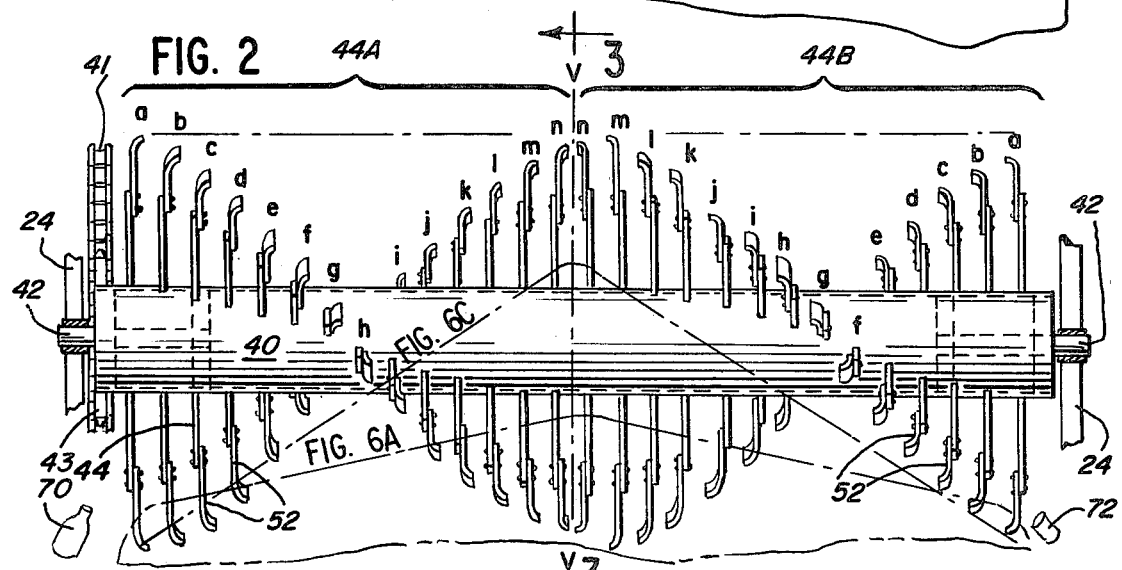
FIG. 2 is an enlarged front view of the cultivator rotor or drum on the machine shown in FIG. 1, with the profile of the windrow shown in phantom lines at different stages of the composting operation.

The blades 52 are shown identical in form each having a flat body 54 curved slightly backwardly and fastened in either mode shown in FIG. 5 or 5A by bolts 56 extending through the bolt holes 46 (FIG. 3). Each blade has a transversely offset paddle or hook portion 58 extending, typically, two to three inches toward the center of the machine. The blades on opposite sides of the central vertical plane V—V are, in effect, mirror images of one another. While they are all curved backward relative to the direction of rotation as shown in FIGS. 3, 5, and 5A, the offset end portions 58 extend to the right in group 44A, and to the left in group 44B as seen in FIG. 2.

Blades 52, in radial mode shown in FIG. 5A, may be used where a large amount of fluffing and aeration is needed. The diagonal mode shown in FIG. 5 may be used where lesser aeration is needed and may result in some power saving.

The importance of the double helical, symmetrical blade arrangement of the present invention (shown in FIG. 2) was not understood when applicant made one of his first test rotors shown in FIG. 4. As a result, there were more transverse paddle portions 58 urging compost material in one direction than in the opposite direction. As a consequence, the windrow W' would peak off center, along a line P when the cultivator was making a pass in one direction, and would move the peak over to a line P' when making a pass in the opposite direction. The non-symmetrical arrangement shown in FIG. 4 thus wasted power in moving the bulk of the windrow material sidewise without appreciably raising the peak to narrow the base and compact the windrow for the best chimney effect.

Use and operation of the invention in a simple composting process will now be described.

The waste products to be composted will be moved to a suitable flat land site, typically by truck, and deposited in long rows. A cross-section of one such row is designated 68 in FIG. 6. Large, non compostable objects are exemplified by a bottle 70 and a can 72.

Next, the cultivator 18 is moved along the material, as shown in FIG. 1. Typically, the cultivator will tram at a speed of about 10 to 15 feet per minute while the drum 38 rotates, in the same direction as the wheels, at about 180 revolutions per minute. This forms the windrow 30, as shown in FIG. 6A, with a peak P". As an example, the diameter of the drum, in one such machine, across the tips of the cultivator blades, is about three feet, so the velocity of the blade tips relative to the ground is in the order of 1,700 feet per minute. This assures very thorough mixing and aeration of the waste material being composed, without requiring much power because each blade or knife 52 turns only about a two-to-three-inch width of the pile in its sweep through the windrow, and only a few blades are in the pile at any one time. A uniform vortex action, as shown by the arrows in FIGS. 6A-6C occurs on each side of the central plane V—V. This maximizes at the center, raising the pile with each pass and working objects such as the bottle 70 and can 72, up and out, alongside the base of the windrow.

The first pass of the cultivator results in a low triangular cross-section windrow, perfectly symmetrical on opposite sides of the central vertical plane V—V. This is illustrated in FIG. 6A and the contour, further, is phantomed onto FIG. 2 where it is marked "FIG. 6A".

Successive passes, in opposite directions are made about once a day. The windrow gradually, day by day, increases in height and finally narrows across the base to the contour shown in FIG. 6C. This final windrow contour, marked "FIG. 6C", is phantomed onto FIG. 2. The composition is tested periodically and suitable additives and inoculums applied through the spray pipe 36 from tank 35. The process may take between two and eight weeks to complete the production of first grade, commercially marketable humus.

The composting process is one of aerobic digestion, which means that the decomposition requires oxygen brought constantly into fresh contact with the material being digested. Heat is evolved because of the following factors. First, it produces heat because it is an oxidation process. Second, heat accelerates the process as it does most chemical processes; thus, there is a chain reaction in which heat produces more heat. Third, the oxygen used up in the heat generating process is regularly replaced by recirculating compost material from the outside to the inside of the windrow.

The interior of the windrow is hot while the surface, exposed to the atmosphere, is much cooler. The ideal contour of the windrow is a compact profile comprising a high triangle with a narrow base to keep the interior hot so the chemical action will proceed rapidly to provide a "chimney action" for the heat rising within the pile to act on the material up near the top, and to provide proper drainage of the pile.

The symmetrical blade arrangement in the drum shown in FIG. 2 provides optimum utilization of the oxidation-generated heat by raising the windrow and narrowing the base on successive passes, an exemplified by FIGS. 6 to 6C.

The shoulders of the triangular windrow in FIG. 6C tend to approximate the angle of repose of the material, about 30°. Non-compostable items 70 and 72 roll down to the sides where they can readily be collected.

An alternate form of blade 62 is shown in FIGS. 7 and 8. Each is made of flat, steel stock having a straight body portion 61 attached to a corresponding post 44 by bolts 56. Each has a curved outer portion 63 with an arcuate, leading cutting edge 65. It illustrates one of the many forms of blades that applicant has devised for special purposes and is most effective where a shredding operation is desired, for example in shredding paper, magazines cardboard cartons, and the like to prepare them for composting. FIG. 7 illustrates one of the blades 62 in radial mode, similar to FIG. 5A. Alternatively, they may be fastened on the posts 44 in a diagonal mode as described in connection with FIG. 5.

Figure 9:
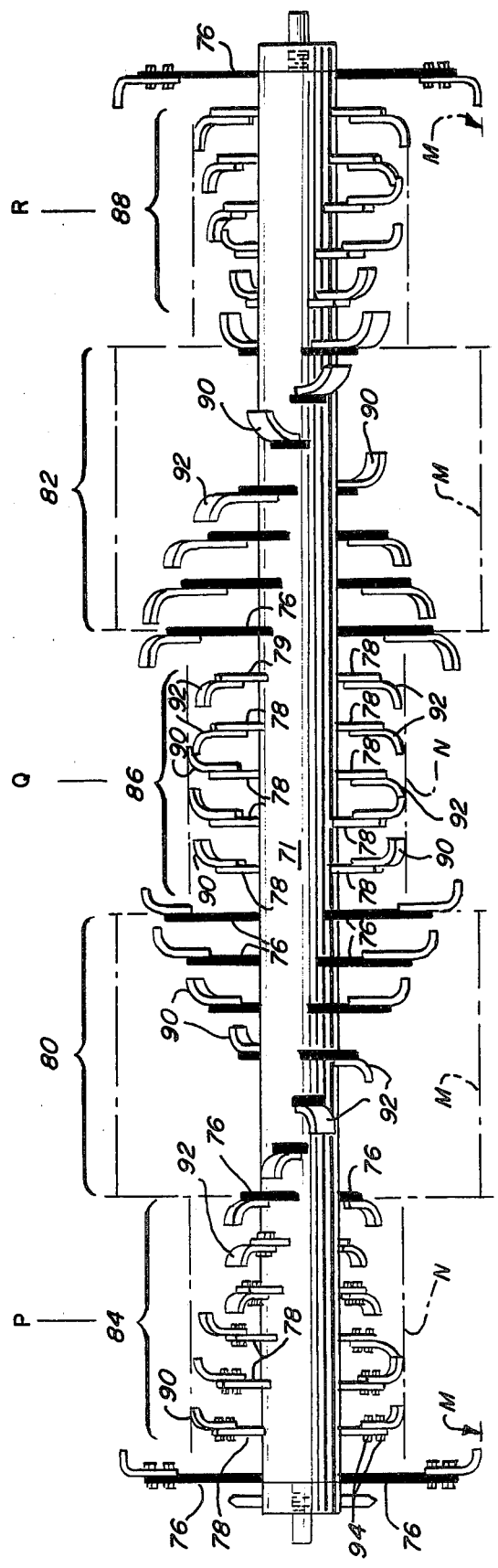
FIG. 9 is a view similar to FIG. 2 of a modified form of cultivator rotor or drum to provide parallel ridges and furrows for certain agricultural applications.
Figure 10:
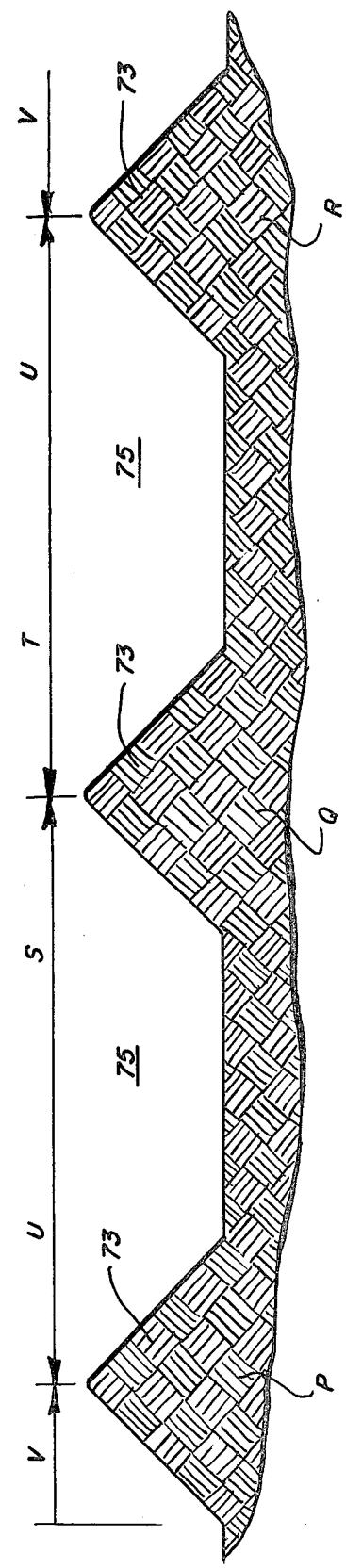
FIG. 10 is a vertical sectional view of the ground after it has been treated by the drum in FIG. 9, showing cross-sections of ridges and furrows produced by it.

Another form of rotor or drum which can be used in the cultivator machine 18, for agricultural purposes, is generally designated 71 in FIG. 9. When a machine so equipped is trammed across a field, it generates a ground contour as shown in FIG. 10 consisting of a series of parallel elevated ridges 73 and depressed furrows 75. This is especially useful for crops such as cotton which can be planted in the ridges and irrigated in the furrows.

The drum 71 is comparable to the drum 40 described in the previous embodiment. The mounting posts 76 and 78 are comparable to the mounting posts 44 except that posts 76, which are darkened in FIG. 9, are relatively long; and the mounting posts 78, which are unshaded to provide contrast, are relatively short. Posts 76 are all the same (long) length and posts 78 are all the same (short) length.

As shown in FIG. 9, there are sixteen diametrically opposed pairs of long posts 76. One pair is at each of the left and right ends of the drum. Seven pairs are in each of two groups 80 and 82.

There are fifteen diametrically opposed pairs of short posts 78, 78. Five pairs are in each of three groups 84, 86 and 88, vertically aligned with ground ridges 73 which they generate as will be described.

Each of the posts 76 and 78 has a blade 90 or 92 (similar to blades 52) side-mounted by bolts 94 (similar to bolts 56). The blades 90 and 92 are substantially identical except that blades 90 are right-handed in the sense that the paddle ends extend to the right in FIG. 9; and the blades 92 are left-handed in the same sense. Although the blades themselves are all the same length, they are supported at two different distances from the drum 70 because posts 76 are longer than posts 78. To simplify the description, therefore, blades supported on the long posts 76 will be referred to as "long blades" and those supported on the short posts 78 will be referred to as "short blades".

Starting at the left end of the drum in FIG. 9, and moving to the right, each successive blade is angularly displaced about the circumference of the drum exactly 12° clockwise from the previous one. That is, the first pair of blades, at the left end of the drum, are mounted on long posts 76, 76 which are vertical in the left end view of FIG. 9. The second pair of posts (which are short posts 78, 78) are angularly displaced about the circumference 12° clockwise from the first pair of posts. The third pair of posts, which are also short posts 78, 78 will be angularly displaced 12° farther clockwise from the second pair and so on across the full length of the drum.

The five pairs of short blades in each of groups 84, 86, and 88 rotate in a cylindrical space indicated by the letter N. The seven pairs of long blades, in each of groups 80 and 82, rotate in a cylindrical space indicated by the letter M.

At the center of the drum the five pairs of short blades in group 86 straddle a vertical plane Q—Q. As shown in FIG. 9, this is transverse to the axis of the drum. The other two groups 84 and 88 of short pairs of blades, similarly, straddle vertical planes P—P and R—R respectively. The two pairs of short posts 78, 78 on the left and right sides of the vertical plane Q—Q have blades 90 and 92 with paddle portions offset toward plane Q—Q and are contoured to move dislodged ground or earth material toward the center, causing the corresponding ridge 72 to peak up into a triangular form as shown in FIG. 10. The center pair of short posts 78, 78 being located in plane Q—Q, have blades 90 and 92 extending in opposite directions. Groups 84 and 88 are identical to group 86 so will not be described in detail. While the rotor illustrated in FIG. 9 provides three ridges 72 as shown in FIG. 10, the rotor design may be modified to provide more or less than three ridges.

The short blades in groups 84, 86 and 88 move ground or earth material in ridges 73 which peak along the vertical planes P—P, Q—Q and R—R. The long blades in groups 80 and 82, and the end pairs of long blades in posts 76, 76 dig the furrows 75 and transfer the dislodged material to the nearest ridge 73. The center pairs of posts in each of groups 80, 82 84, 86 and 88 have paddles 90 and 92 canting in opposite directions.

Material dislodged from the furrows on the sides of the center ridge 72 is moved in the direction of the arrows S and T to produce the center ridge. Likewise, material moved in the directions of the arrows U and V produce the material for the side ridges.

As has been described, the agricultural rotor shown in FIG. 9 has pluralities of groups of short and long blades which extend in two helical arrays between opposite ends of the drum 71, these helical arrays being circumferentially spaced 180° apart about the drum and consisting of individual blades uniformly angularly and axially spaced about and along a drum. These provide, in a single pass across the field, parallel elevated ridges 73 ready for planting and the furrows 75 provide irrigation channels.

While specific preferred embodiments of this invention have been described, it will be apparent that other specific constructions are possible within the spirit and scope of the invention.

The embodiments of the invention in which an exclusive property or privilege is claimed are defined as follows:

1. In a cultivator having a frame, wheel means adapted to support the frame over a windrow of material such as compost, power means for rotating said wheel means in a direction to tram the cultivator along the windrow, an improved windrow disintegrator and aerator rotor comprising:

a drum journaled in the frame for rotation about a horizontal axis extending crosswise of the windrow and power means for rotating said drum in the direction of rotation of said wheel means;

a plurality of radial mounting posts fixed to the drum, said posts being arranged in a helical pattern having substantially one complete revolution between opposite ends of the drum, a substantially equal number of said posts being on each side of a central vertical plane along the longitudinal centerline of the frame, said posts being thin relative to the space between adjacent posts measured axially of the drum to minimize shear resistance of the posts within the windrow; and cultivator blades supported on the outer ends of said posts, each of said blades having at its outer end a transverse paddle portion offset toward said central vertical plane and contoured to move material at the bottom of the windrow selectively sidewise along the ground toward the center of the windrow at said central vertical plane to thereby circulate material in the windrow in two distinct closed flow paths inwardly along the ground from the outer edges, upwardly along the central vertical plane, and then outwardly and downwardly with the aid of gravity along the top surfaces;

whereby repeated passes of said cultivator centered along a windrow circulates material between the inside and the outside of the windrow to aerate it while maintaining the windrow with a triangular cross-section of ever-increasing height and ever-diminishing base width symmetrical in shape and size on opposite sides of said central vertical plane.

2. In a cultivator, the combination of claim 1 in which said posts are supported in diametrically opposed pairs on said drum, each of said pairs being in a common vertical plane to provide a double helical pattern of substantially one complete revolution between the ends of the drum.

3. In a cultivator, the combination of claim 1 in which said cultivator blades are removably attached to the posts at positions canted backwardly relative to the direction of rotation of the drum.

4. In a cultivator, the combination of claim 1 in which said posts are arranged in identical double helical arrays on opposite sides of said central vertical plane.

5. In a cultivator, the combination of claim 4 in which the double helical arrays on opposite sides of the drum comprise uninterrupted continuations of one another across said central vertical plane.

6. In a cultivator, the combination of claim 1 in which said posts are equally axially and circumferentially spaced across the surface of the drum and said posts are grouped in substantially identical arrays on opposite sides of said central vertical plane.

7. In a cultivator having a frame, wheel means adapted to support the frame over a windrow of material such as compost, power means for rotating said wheel means in a direction to tram the cultivator along the windrow, an improved windrow disintegrator and aerator rotor comprising:

a drum journaled in the frame for rotation about a horizontal axis extending crosswise of the windrow and power means for rotating said drum in the direction of rotation of said wheel means;

a plurality of radial mounting posts fixed to the drum, said posts being arranged in a helical pattern having substantially one complete revolution between opposite ends of the drum, a substantially equal number of said posts being on each side of a central vertical plane along the longitudinal centerline of the frame, said posts being thin relative to the space between adjacent posts measured axially of the drum to minimize shear resistance of the posts within the windrow; and cultivator blades supported on the outer ends of said posts, each of said blades being flat in a plane perpendicular to the axis of rotation of the drum, each blade having an outer portion canted or curved backwardly relative to the direction of rotation of the drum, and the leading edge thereof being characterized by a knife-like cutting edge to facilitate shredding paper, magazines, cardboard cartons, and the like.

8. In a cultivator having a frame, wheel means adapted to support the frame for movement over a ground surface for forming parallel elevated ridges and depressed furrows in said ground surface, power means for rotating said wheel means in a direction to tram the cultivator across said surface, an improved row forming rotor comprising:

an elongated drum journaled in the frame and rotated by power about a horizontal axis extending crosswise of the line of movement of the frame, thin radial mounting posts, with cultivator blades on the ends thereof, angularly spaced apart about the circumference of the drum and spaced apart lengthwise along the axis of the drum to form a continuous helical pattern, at least one group of said posts being relatively short and straddling a vertical plane transverse to the axis of the drum and another group of said posts flanking said one group on one side being relatively long, the blades on both of said groups of posts having paddle portions at the outer ends thereof offset toward said vertical plane and contoured to move dislodged ground material sidewise from the blades mounted on the long posts to the blades mounted on the short posts toward said vertical plane;

whereby the blades mounted on the long posts dislodge material from the ground to create a furrow and move the dislodged material from the furrow sidewise to the blades mounted on the short posts which create a ridge by heaping the material to a high point along said vertical plane.

9. In a cultivator, the combination of claim 8 in which said one group of short posts is flanked by a group of said other, long posts on each side, whereby to dislodge and move ground material to the ridge from both sides of the ridge.

10. In a cultivator, the combination of claim 6 in which the drum has a plurality of groups of said, short posts and a plurality of groups of said long posts flanking said groups of short posts to enable a single row forming rotor to produce a plurality of parallel ridges with furrows therebetween.

11. In a cultivator the combination of claim 8 in which the posts in said pluralities of groups of short and long posts extend in two helical patterns between opposite ends of the drum, said helical patterns being circumferentially spaced 180° apart about the drum and consisting of individual posts uniformly angularly and axially spaced about and along the drum.

12. In a cultivator for forming parallel ridges and furrows in a ground surface, a frame, wheel means adapted to support the frame for movement over the ground, power means for rotating said wheel means in a direction to tram the cultivator along the ground, an improved ridge and furrow forming rotor comprising:

a power driven drum journaled in the frame for rotation about a horizontal axis extending crosswise of the line of movement of the frame;

cultivator blades axially and circumferentially spaced in a helical pattern on said drum between opposite ends thereof;

said rotor being adapted to make at least one ridge in the ground flanked on each side by furrows all of which are parallel to the line of movement of the frame, said ridge being positioned along a vertical plane intersecting the drum;

said cultivator blades comprising predetermined long and short blades;

a group of said short blades being centered at said vertical plane to make said ridge in the ground surface, and a group of said long blades flanking said group of short blades on each side to make furrows flanking said ridge;

all of said blades, regardless of length, having at their extreme outer ends transverse paddle portions offset toward said vertical plane and being contoured to move ground surface material sidewise along the ground from the long blades to the short blades toward the ridge;

whereby said groups of long blades dislodge material from the ground to create furrows spaced apart on opposite sides of said vertical plane and move the material sidewise into the space between said furrows, and whereby further said group of short blades help create a ridge by heaping said dislodged ground material to a high point along said vertical plane.

13. In a cultivator for forming parallel ridges and furrows in a ground surface, a frame, wheel means adapted to support the frame for movement over the ground, power means for rotating said wheel means in a direction to tram the cultivator along the ground, and improved ridge and furrow forming rotor comprising:

a power driven drum journaled in the frame for rotation about a horizontal axis extending crosswise of the line of movement of the frame;

cultivator blades axially and circumferentially spaced in a helical pattern on said drum between opposite ends thereof;

said rotor being adapted to make a plurality of ridges in the ground parallel to the line of movement of the frame, a center one of said ridges being positioned along a central vertical plane intersecting the mid-point of the drum, and at least two other of said ridges being spaced from said center ridge by furrows flanking said center ridge, said other ridges being positioned along other vertical planes intersecting the side portions of the drum;

said cultivator blades comprising predetermined long and short blades;

groups of said short blades being centered at said vertical planes to make said ridges, each group of short blades being flanked on both sides by pairs of groups of said long blades to create furrows spaced apart on opposite sides of the corresponding vertical plane;

all of said blades, regardless of length, having at their extreme outer ends transverse paddle portions offset toward the nearest of said vertical planes and being contoured to move ground surface material sidewise along the ground from the long blades to the short blades toward the nearest ridge;

whereby each pair of groups of long blades cooperate to dislodge material from the ground to create a pair of furrows spaced apart on opposite sides of a corresponding one of said vertical planes and move the material sidewise into the space between said furrows, and whereby further the group of short blades between each pair of groups of long blades help create a ridge by heaping said dislodged ground material to a high point along said corresponding vertical plane.

* * * * *